US009773353B2

(12) United States Patent
Naamani et al.

(10) Patent No.: US 9,773,353 B2
(45) Date of Patent: Sep. 26, 2017

(54) WIRELESS AUTOMOTIVE INTERFACE DEVICE

(71) Applicants: Ehud Naamani, Ann Arbor, MI (US); Issac Zloter, Holon (IL); Dan Shneider, Holon (IL)

(72) Inventors: Ehud Naamani, Ann Arbor, MI (US); Issac Zloter, Holon (IL); Dan Shneider, Holon (IL)

(73) Assignee: FusePoint LTD., Holon (IL)

( * ) Notice: Subject to any disclaimer, the term of this patent is extended or adjusted under 35 U.S.C. 154(b) by 0 days.

(21) Appl. No.: 14/509,062

(22) Filed: Oct. 8, 2014

(65) Prior Publication Data

US 2015/0105971 A1 Apr. 16, 2015

Related U.S. Application Data

(60) Provisional application No. 61/889,063, filed on Oct. 10, 2013.

(51) Int. Cl.
G07C 5/00 (2006.01)
H04W 4/00 (2009.01)

(52) U.S. Cl.
CPC .......... *G07C 5/008* (2013.01); *H04W 4/008* (2013.01)

(58) Field of Classification Search
CPC ........ G07C 5/08; G07C 5/0841; G07C 5/008; H04W 88/16; H04W 92/00

USPC ....................................................... 701/33.2
See application file for complete search history.

(56) References Cited

U.S. PATENT DOCUMENTS

| 9,197,729 B2* | 11/2015 | Bury | H04M 1/6091 |
| 2009/0054069 A1* | 2/2009 | Calnan, III | H04L 67/34 |
| | | | 455/445 |
| 2013/0305262 A1* | 11/2013 | Nara | G06F 9/4425 |
| | | | 719/320 |

\* cited by examiner

*Primary Examiner* — Redhwan K Mawari
*Assistant Examiner* — Anshul Sood

(57) ABSTRACT

A method of automatically establishing a data connection between a wireless automotive interface component and a mobile communication device, comprising: providing a wireless automotive interface component connected to a vehicle's On-Board Diagnostics (OBD) port, the interface component comprising: a short range communication module; and a vehicle network protocol interface; providing a mobile communication device running a gateway module; representing an automatically recognizable Bluetooth profile and a Serial Port Profile (SPP) by the wireless interface component; detecting the automatically recognizable profile by the mobile communication device; searching for the SPP profile by the mobile communication device; and automatically establishing a data connection between the wireless interface component and the mobile communication device via the SPP profile.

22 Claims, 4 Drawing Sheets

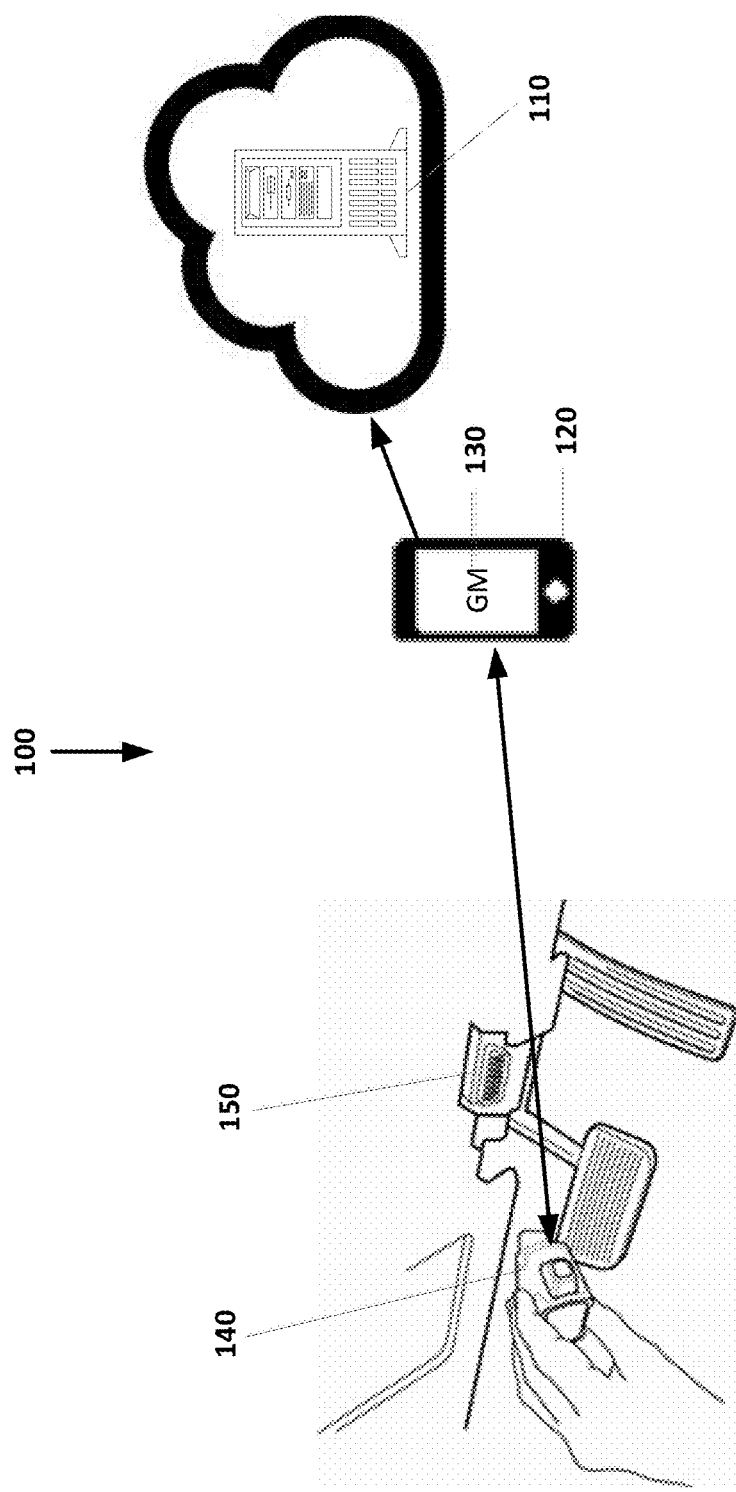

WIRELESS AUTOMOTIVE INTERFACE DEVICE

CROSS-REFERENCE TO RELATED PATENT APPLICATIONS

This patent application claims priority from and is related to U.S. Provisional Patent Application Ser. No. 61/889,063, filed Oct. 10, 2013, this U.S. Provisional Patent Application incorporated by reference in its entirety herein.

FIELD OF THE INVENTION

The present invention generally relates to wireless connections with devices brought on board vehicles and more specifically to a connection between an Automotive Interface Component and an electronic communication device.

BACKGROUND

Many service providers, such as auto garage owners, wish to be continuously informed of the condition of their customers' vehicles, in order to be able to offer them the right service at the right time; a service the customers might not even know they need. Some vehicle owners would like to be informed of the condition of their vehicle for different reasons like the "do it yourself" person or to better negotiate the cost of repair. To learn about the health of vehicles, solutions known in the art connect to the vehicle networks where relevant data is exchanged between the computers that control the vehicle. Connections to a vehicle's systems often take advantage of the standardization of an On Board Diagnostics (OBD) port to connect to vehicle networks. The solutions known in the art that collect this data onto local memory and include processing computing powers are often expensive, same as those that choose to transfer the data via long range wireless connection such as cellular. Other solutions communicate the data for processing in a different way, lowering the cost of the interface, some transferring the data collected via a wired connection such as USB and some via short range connection such as BLUETOOTH or ZIGBEE.

The OBD is an automotive term referring to a vehicle's self-diagnostic and reporting capability. OBD systems give the vehicle owner or repair technician access to the error codes initiated by the various vehicle sub-systems. Modern OBD implementations use a standardized digital communications socket to provide access to real-time data on vehicle control network in addition to a standardized series of diagnostic trouble codes (DTCs), which allow one to rapidly identify malfunctions within the vehicle. Use of a short range radio to transfer data collected is often not energy efficient because of the constant power this radio consumes even when no data is transferred. In general BLUETOOTH implementations are set to operate in a listening mode in order to avoid radio transmissions that can be taxing on the limited energy available to battery powered devices like a vehicle that is not running or a mobile communication device. While in this state, an implementation can allow the device to be discoverable. In discoverable mode the device will respond to a request to connect that comes from a device it was paired with before. Hence, most commonly one device has to enter a transmission mode in order to initiate a connection process by issuing an inquiry to explore what other BLUETOOTH radios are in its vicinity. However in the absence of an event to trigger such switch to transmission mode, one device must be all the time in transmission mode consuming energy for constant transmissions. BLUETOOTH protocol profiles can help mitigate some of these issues. Profiles are definitions of settings to parameterize and to control the communication from the start based on specific applications. An example of such profile might be a headphone profile or the HID (Human Interface Device) profile, both not data exchange profiles but allow a mobile communication device to have a limited ongoing search for such devices. The first connection with one of these special profiles prevents another connection with the same profile. In the example of a vehicle the desired use of headphone profile is to connect to a hands free talking system whenever the phone is brought on board the vehicle. To preserve energy, headset equipment in vehicles is designed to be powered up when the ignition switch is turned indicating a possible presence of a driver with a mobile communication device in the vehicle and a following ignition indicating power will be provided by the engine. This event causes the headset equipment to initiates a discovery process that will result in an automatic connection to a pre-paired smart phone if the driver carries one. Otherwise, the discovery process will fail to form a connection and no further attempt will be made until the ignition switch is turned on again. There is no such "automatic" connection scheme for data in the art. Devices that are designed to receive their power from standard connections like the OBD port receive power constantly preventing them to use power presence as an indicator of ignition. Devices should not interfere with normal operations of the vehicle they are brought onto like in the headset system example.

Even after connection was made, the transmission bandwidth can be energy consuming pending the amount of data transmitted and received. The art to date teaches a few interface protocols to handle the data that might be found on vehicle networks like ELM 327 or J2534. The interface protocols provide a level of abstraction for the lower level signals they read. Implementations of these protocols most often result in significant bandwidth created by the volume of these abstracted commands needed to extract meaningful information. Vehicle control networks generate large amounts of data that make transmitting it over wireless networks at lower bandwidth and lower cost even more challenging. The OBD port gives access to the multiple control networks of a vehicle. Obviously, use of a wireless communications channel introduces more possibilities of unauthorized access. In the event of a BLUETOOTH protocol, pairing is the basic form of protection known in the art. Because of the significant harm possible in applications like automotive, this defense might not be considered as sufficient protection.

SUMMARY

According to a first aspect of the present invention there is provided a wireless automotive system comprising an interface component connected to a vehicle's On-Board Diagnostics (OBD) port, said interface component comprising: a short range communication module; and a vehicle network protocol interface; said short range communication module configured to automatically establish a data connection with a mobile communication device running a gateway module; said vehicle network protocol interface configured to communicate bi-directionally with said short range communication module to receive requests from said gateway module and to send vehicle data to said gateway module; said vehicle network protocol interface further configured to communicate bi-directionally with said OBD port to send said requests to the vehicle's networks and to derive vehicle data therefrom.

The connection may be Bluetooth.

The interface component may comprise HID and SPP profiles.

The vehicle data may comprise at least one of: amount of fuel, odometer count and engine speed.

The requests may be encrypted and the system may further comprise an interpreter connected between said short range communication module and said network protocol interface, the interpreter may be configured to: receive said encrypted requests from said gateway module; interpret said received requests; send the interpreted requests to said network protocol interface; and send derived vehicle data to said gateway module.

The interpreter may further be configured to encrypt said derived vehicle data before sending it to said gateway module.

The system may further comprise a communication controller which may be configured to power said short range communication module based on data received from said On-Board Diagnostics port and connect the protocol interface with the interpreter; wherein said data indicates that the vehicle's ignition switch is turned ON.

The system may further comprise a communication controller which may be configured to power said short range communication module based on data received from said On-Board Diagnostics port and connect the protocol interface with the short range communication module; wherein said data indicates that the vehicle's ignition switch is turned ON.

The mobile communication device may further be configured to upload said derived vehicle data received by said gateway module to a server.

The server may comprise a service provider's server.

According to a second aspect of the present invention there is provided a method of automatically establishing a data connection between a wireless automotive interface component and a mobile communication device, comprising: providing a wireless automotive interface component connected to a vehicle's On-Board Diagnostics (OBD) port, said interface component comprising: a short range communication module; and a vehicle network protocol interface; providing a mobile communication device running a gateway module; representing an automatically recognizable Bluetooth profile and a Serial Port Profile (SPP) by the wireless interface component; detecting said automatically recognizable profile by the mobile communication device; searching for said SPP profile by the mobile communication device; and automatically establishing a data connection between said wireless interface component and said mobile communication device via said SPP profile.

The method may further comprise: receiving data requests from said gateway module; deriving vehicle data from the vehicle's networks according to said data requests; and sending said derived vehicle data to the gateway module.

The interface component may further comprise an interpreter and wherein said data requests may comprise encrypted data requests, the method may further comprise: interpreting said encrypted data requests by said interpreter.

The method may further comprise encrypting said derived vehicle data.

The interface component may further comprise a communication controller, the method may further comprise: receiving from said OBD port data indicating that the vehicle's ignition switch is turned ON; powering said short range communication module; and connecting said protocol interface with said interpreter.

The interface component may further comprise a communication controller, the method may further comprise: receiving from said OBD port data indicating that the vehicle's ignition switch is turned ON; powering said short range communication module; and connecting said protocol interface with said short range communication module.

The mobile communication device may comprise a smartphone.

The method may further comprise uploading said derived vehicle data to a server by said mobile communication device.

The server may comprise a service provider's server.

The method may further comprise uploading said derived vehicle data to a server by said mobile communication device.

The server may comprise a service provider's server.

The automatically recognizable profile may be a Human Interface Device (HID) profile.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1 is a schematic view of a system according to the present invention;

DETAILED DESCRIPTION OF PREFERRED EMBODIMENTS

Figure 1A:
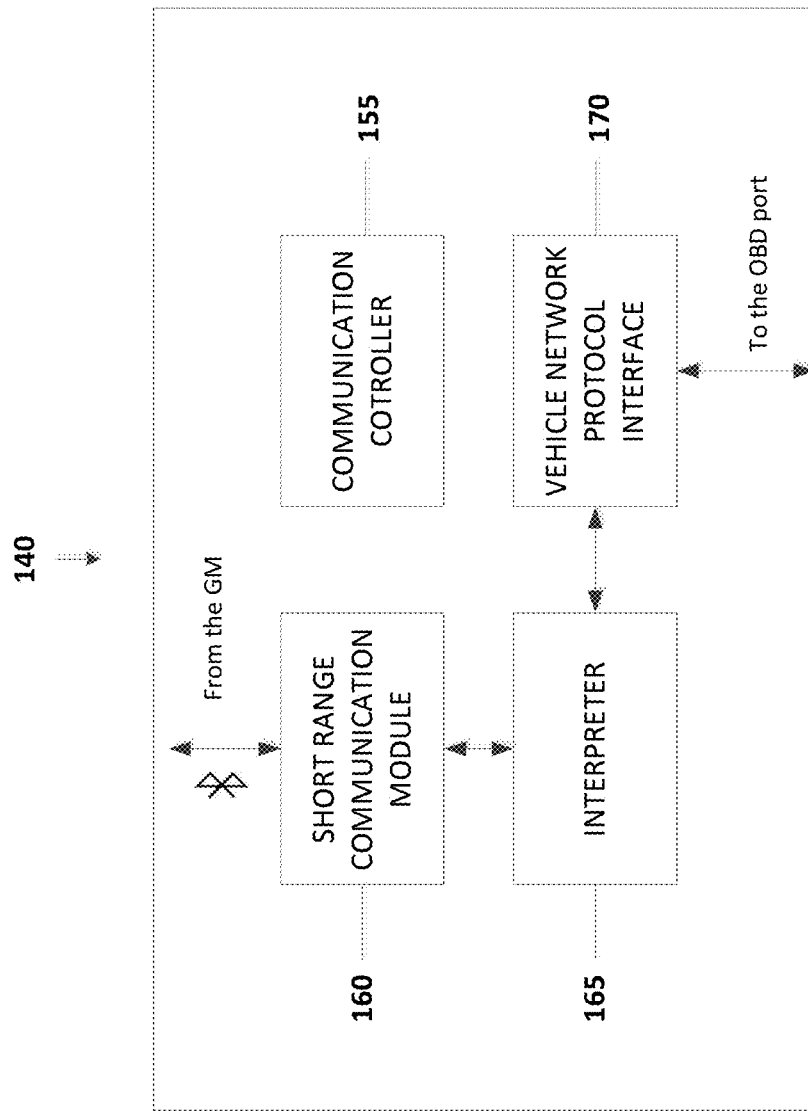
FIG. 1A is a schematic view of the Automotive Interface Component according to the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention aims to enable an automatic, energy efficient and secured low cost connection to an Automotive Interface Component connected to a vehicle's OBD port.

The connection enables to remotely monitor the vehicle. This monitoring is performed by using the Automotive Interface Component of the present invention to establish a data connection between a mobile communication device and the vehicle's networks. The Automotive Interface Component enables an automatic data connection to a mobile communication device, it is energy efficient, enables secured communication and cost effectiveness that are not found in the known art. According to embodiments of the invention, the Automotive Interface Component is a designated component connected to the OBD port of a vehicle. In a preferred embodiment, the mobile communication device serves as a gateway that uploads the vehicle's data (derived from the OBD port) to a service provider's server on the cloud (via long range wireless connection such as cellular or Ethernet), thus enabling the service provider to continuously monitor the users' vehicles and to offer them new services even when they are not in its shop. This Automotive Interface Component is very cost effective also because it eliminates the need for dedicated long range radio and communication hardware that is expensive to purchase and to operate (requires a cellular plan), it minimizes the bandwidth requirements, and it eliminates the need for complex processing of converting the data to the desired information.

According to embodiments of the invention, the Automotive Interface Component uses a short range communications such as BLUETOOTH wireless communication channel to connect the OBD port to a mobile communication device (MCD). According to embodiments of the invention, this short range wireless BLUETOOTH communication does not interfere with other BLUETOOTH application connections (such as hands free system), does not affect the vehicle's battery operation and has minimal bandwidth requirements from the radio and MCD. To enable some of these features, the MCD serves as a data gateway to a service provider's server, using its long range communication and processing capabilities vs. including them in the Interface Component.

According to embodiments of the invention, the short range wireless communication channel is activated only when the vehicle's ignition is on or about to be turned on. If the short range wireless communication was constantly active, the configuration would have been less energy efficient, would have affected the performance of the host vehicle and its battery and would have created a vulnerability to hackers seeking to affect the performance of the host vehicle.

Furthermore, this approach may have consumed the MCD's computing resources and bandwidth.

The Automotive Interface Component is connected to the OBD port which provides it power at all-times regardless of the ignition switch status. This prevents the possibility of using the power presence as an indication of an engine ignition event. The Automotive Interface Component of the present invention may use a low power feature, such as a Peripheral Interface Controller (PIC) chip and/or firmware (e.g. 430F2131 available from http://www.ti.com/), to repeatedly query the vehicle networks in order to find the data that indicates engine ignition. Until then, the component keeps the radio in energy efficient listening mode only or OFF, avoiding consuming any communication power or bandwidth and eliminating unauthorized access. When the indication is found, namely when the ignition switch of the vehicle is turned on, a communication controller connected with the protocol interface switches the short range communication module ON and into a discovery mode and redirects the communication lines to connect the protocol interface to an interpreter. The interpreter instructs the protocol interface what data to search for and feeds the derived data from the vehicle's networks to the Gateway Module via the short range communication module (e.g. by BLUETOOTH). Once in the discovery mode, the BLUETOOTH radio of the present invention causes the driver's mobile communication device to automatically connect to it with a data connection.

The Automotive Interface Component may comprise a proprietary interpreter feature which reacts only to known requests none of which can affect the vehicle network in an adverse way. Attempts to use the wireless connection to present requests, which are not within the pre-determined authorized requests, to the Automotive Interface Component are identified and rejected by the interpreter. This strengthens security and prevents hacking.

The interpreter reacts only to specific high level requests that were pre-configured. The interpreter then determines the set of actions that needs to be done, such as, parameters to read, protocol elements to use or the network requests needed in order to derive the requested data from the vehicle's networks. It further reduces communicating raw data by processing derived data in the Automotive Interface Component, which reduces bandwidth requirements. Pre-configured requests can be provided to the interpreter dynamically pending a secured process and authorized connection.

FIG. 1 is a schematic view of the system 100 according to the present invention, comprising: a service provider's server 110, a user mobile communication device (MCD) (e.g. smartphone) 120 running a Gateway Module (GM) 130 and a designated Automotive Interface Component 140. The component 140 is connected to the vehicle's OBD port 150, with a short range radio compatible with BLUETOOTH profiles SPP (Serial Port Profile) and HID (Human Interface Device) and runs a software or firmware interpreter, a communication controller and a vehicle network protocol interface that will be explained in conjunction with FIG. 1A.

The Gateway Module 130 may additionally or alternatively service a designated Gateway Application or other applications for deriving vehicle data. The applications may be authorized to re-configure different requests for the interpreter.

FIG. 1A is a schematic view of the Automotive Interface Component 140 according to embodiments of the present invention, comprising: a communication controller 155 which is configured to set the state of the Interface Component's radio based on the data received from the OBD port about engine ignition, a short range communication module 160 that enables automatic data connection initiated by the Automotive Interface Component for data streaming in and out of the component (by BLUETOOTH for example), an interpreter 165 which interprets the Gateway Module's requests and a vehicle network protocol interface 170 which is configured to translate the interpreted requests to network protocol compliant signals in order to communicate on the vehicle's networks.

The interpreter 165 is configured to receive specific encrypted commands from the Gateway Module 130, interpret them and communicate the resulting requests and/or commands to the vehicle network protocol interface that converts them to network compliant signals to derive specific data in response. The communication controller prevents access to the vehicle's networks when the engine is not running. The interpreter prevents communicating to the vehicle's network protocol commands (that are not part of the specific pre-configured requests) blocking unauthorized entities from deriving the vehicle's data or sending destructive orders to the vehicle's networks via the wireless connection.

According to embodiments of the invention, the interpreter may encrypt the derived data received from the vehicle's network before sending it back to the Gateway Module.

According to embodiments of the invention, modules 155, 165 and 170 may comprise a single software module or separate software modules.

According to embodiments of the invention, the communication controller may be removed. In such case, as long as the Automotive Interface Component is connected to the OBD port, the component's radio is ON.

According to embodiments of the invention, the interpreter may be removed. In such case, when the communication controller (connected with the protocol interface) switches the short range communication module ON and into a discovery mode it redirects the communication lines to connect the protocol interface to the short range communication module. Namely, the short range communication module communicates bi-directionally with the vehicle network protocol interface and no encryption takes place.

According to embodiments of the invention, the Automotive Interface Component may be an aftermarket Automotive Interface Component.

The SPP profile is a BLUETOOTH profile required to communicate data but cannot be automatically discovered by the user's MCD. In order to establish an automatic connection a discoverable profile must be used.

The HID profile is discoverable and automatically recognized by a MCD (compatible with BLUETOOTH). It does not compete with other vehicle applications at the ignition event. However HID profile does not allow transfer of data like the data collected by the Interface Component.

Figure 2:
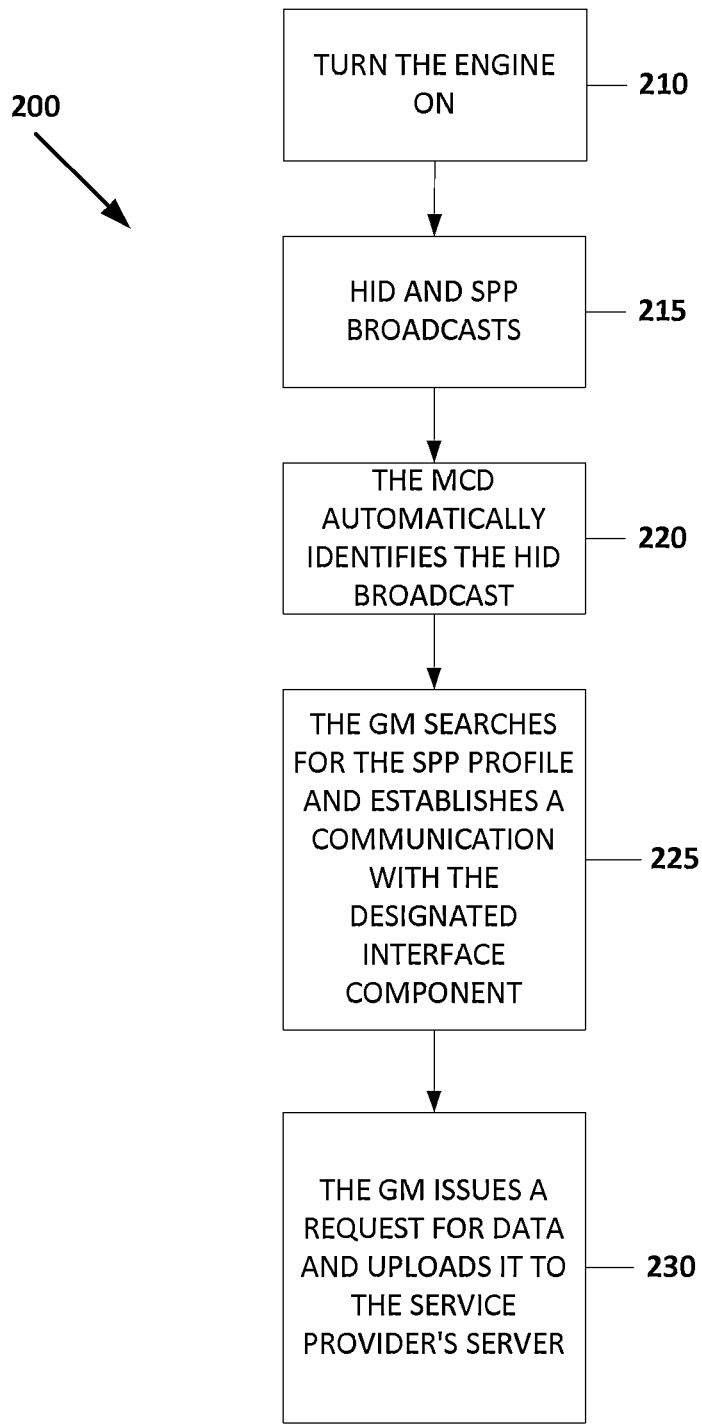
FIG. 2 is a flowchart showing a connection process according to embodiments of the present invention.

Hence, the Gateway Module (GM) is configured to initiate a search for a SPP once the MCD discovers an HID profile. This process is more robust than processes used otherwise such as a headset or hands free processes, and overcomes failures such as disconnection by the user, reboot of the MCD, incidental disconnection and the like, namely, whenever a failure occurs, the search process automatically starts again. When the SPP profile is detected, the Gateway Module is configured to automatically establish data connection with the Interface Component. This connection is automatically recovered whenever connection is lost. Unlike what is common in the art, no action is required by the user of the MCD. The communication is initiated by the Automotive Interface Component when the ignition switch is turned on and not as common in the art, by the host; and the channel is kept active as long as the ignition switch is ON. FIG. 2 is a flowchart showing the connection process 200 according to embodiments of the present invention.

The process begins in step 210 as a user gets into his vehicle, carrying his MCD (compatible with BLUETOOTH) running the Gateway Module (preferably in the background) and turns the ignition switch to start the engine. The Automotive Interface Component is configured to constantly search for data that indicates the engine's ignition. As long as such indication is not found, the Automotive Interface Component is kept in an energy efficient and secured mode. When the indication is found, the short range communication radio is turned on with two profiles (HID and SPP) and the component is placed in a discovery mode. As a result of turning the ignition switch, in step 215, the Automotive Interface Component 140 represents its existence in HID profile (and SPP profile). HID profile is discoverable automatically by most mobile communication devices with BLUETOOTH but does not support transmissions of data. In step 220 the MCD automatically discovers the HID profile and broadcasts a notification about it. In step 225, the Gateway Module (GM) receives the notification and initiate/request a search for a SPP profile in order to establish a data connection with the Automotive Interface Component (if they were paired before). When the connection has been established, in step 230, the GM may issue an encrypted request for data to the Automotive Interface Component and upload the data it receives in return to the service provider's server.

According to embodiments of the present invention, the HID profile may be replaced with any BLUETOOTH profile which is discoverable and automatically recognized by a MCD (compatible with BLUETOOTH).

The Gateway Module may derive from the Automotive Interface Component the vehicle's raw data such as the amount of fuel in the tank, the odometer count, the engine speed and the like or higher level application data like average speed, driving time violations, engine load alert, harsh speed change and the like, thus enabling the service provider to monitor the vehicle and to offer the user periodic treatments, alerts about abnormalities, promotions and the like. This data may be communicated from the Gateway Module to a server provider application running on the provider's server and/or to a Gateway Application running on the MCD to provide similar capabilities to the driver.

The Gateway Application using the GM may be:
  A specific application that is compatible with a specific service provider.
  A generic application that is compatible with a number of service providers that the user may choose (e.g. from a list) to communicate with.

As described above, the MCD's connection to the Automotive Interface Component is configured to be established automatically. However after the initial connection (e.g. when a user gets into the vehicle), failures may occur. In such case a recovery process is needed if the connection is to be automatic. This recovery process of automatic connection means that whenever a failure occurs, the connection is established automatically again, as exemplified in conjunction with FIG. 3.

Following is an exemplary implementation of the system and method of the present invention on an electronic communication device running an Android operating system. The Android OS is capable of sending broadcasts to applications that were registered to receive such broadcasts.

The present invention's Gateway Module is registered to receive the broadcast:
"android.hardware.usb.action.USB_DEVICE_ATTACHED"

Once received, the application automatically initiates the serial communication (SPP) to the Automotive Interface Component and the connection is made.

Figure 3:
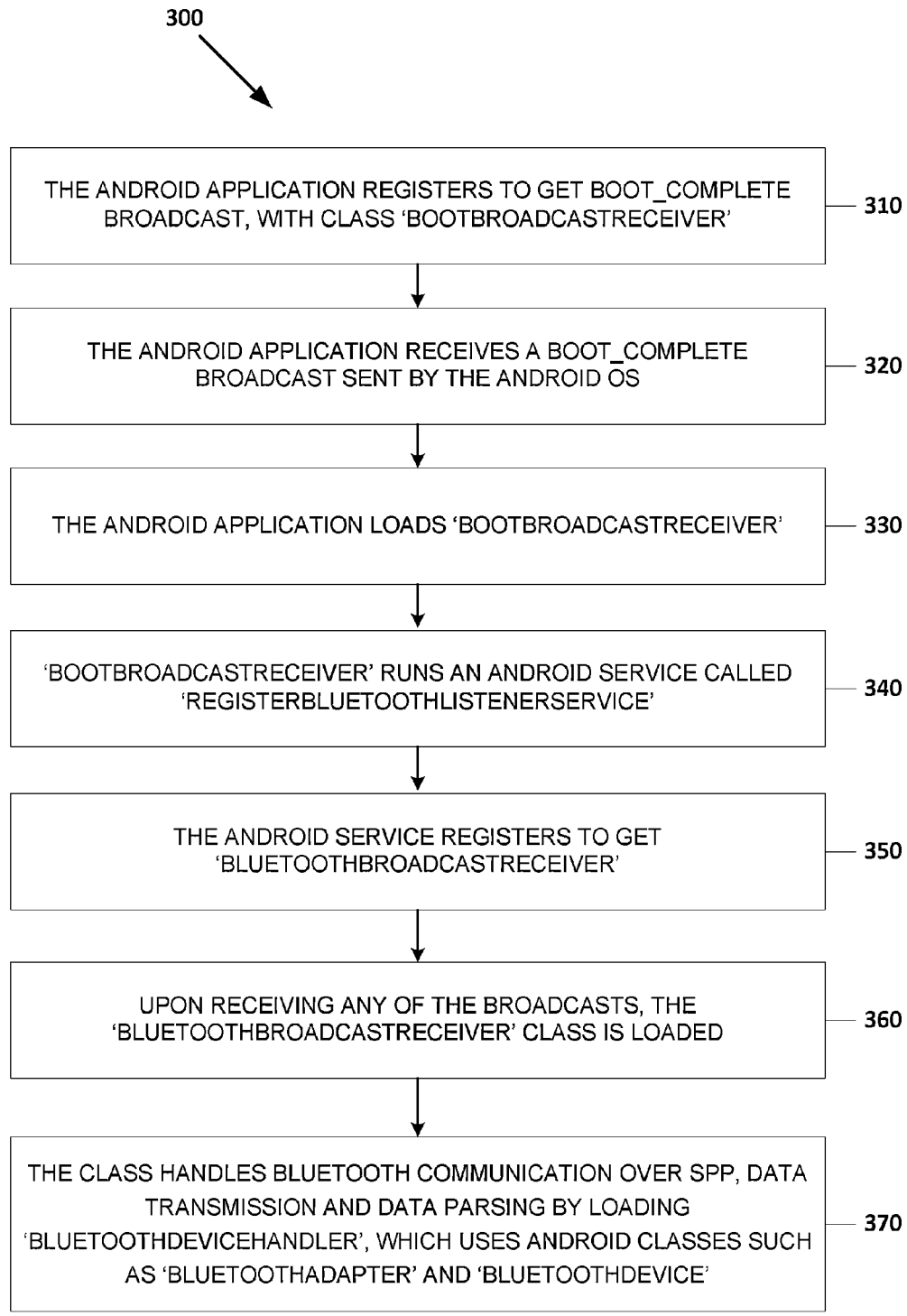
FIG. 3 is a flowchart showing an exemplary automatic start\recovery process performed on a device running Android operating system according to embodiments of the present invention.

FIG. 3 is a flowchart 300 showing the automatic connection and the recovery process on an electronic communication device running an Android operating system according to embodiments of the present invention.

In step 310 the android application registers to get BOOT_COMPLETE broadcast, with class 'BootBroadcastReceiver'. This broadcast is sent by the android OS when the operating system completed its boot. In step 320 the BOOT_COMPLETE broadcast is received from the android OS. In step 330, the 'BootBroadcastReceiver' class is loaded.

In step 340, when the 'BootBroadcastReceiver' class has been loaded, it runs an android service called RegisterBLU- ETOOTHListenerService'. While running, in step 350 this service registers the 'BLUETOOTHBroadcastReceiver' to receive any of a list of broadcasts such as:

android.BLUETOOTH.BLUETOOTHDevice.ACTION_ACL_DISCONNECTED
    android.BLUETOOTH.BLUETOOTHDevice.ACTION_ACL_CONNECTED
    android.BLUETOOTH.BLUETOOTHDevice.ACTION_ACL_DISCONNECT_REQUESTED In step 360, upon receiving any of those broadcasts, the 'BLUETOOTHBroadcastReceiver' class is loaded.

In step 370, according to the received broadcast (any of the broadcasts registered), this class will handle BLUETOOTH communication over SPP, data transmission and data parsing. This is done by loading 'BLUETOOTHDeviceHandler', which uses android classes such as 'BLUETOOTHAdapter' and 'BLUETOOTHDevice'.

It will be appreciated by persons skilled in the art that the present invention is not limited to what has been particularly shown and described hereinabove. Rather the scope of the present invention is defined by the appended claims and includes combinations and sub-combinations of the various features described hereinabove as well as variations and modifications thereof which would occur to persons skilled in the art upon reading the foregoing description.

The invention claimed is:

1. An automotive system comprising an automotive interface component connected to a vehicle's On-Board Diagnostics (OBD) port, said interface component comprising:
    a wireless short range communication module; and
    a vehicle network protocol interface;
        said automotive interface component configured to represent (1) an automatically recognizable profile to be automatically detected by a mobile communication device running a gateway module, and (2) a non-automatically recognizable profile;
        said mobile communication device configured to search for said non-automatically recognizable profile upon detection of said automatically recognizable profile;
        said mobile communication device configured to automatically establish a data connection between said interface component and said mobile communication device via said non-automatically recognizable profile;
        said vehicle network protocol interface configured to communicate bi-directionally with said wireless short range communication module to receive requests from said gateway module and to send vehicle data to said gateway module via said data connection;
        said vehicle network protocol interface further configured to communicate bi-directionally with said OBD port to send said requests to said vehicle's networks and to derive vehicle data therefrom.

2. The system of claim 1, wherein said automatically recognizable profile is a Human Interface Device (HID) profile.

3. The system of claim 1, wherein said non-automatically recognizable profile is a Serial Port Profile (SPP).

4. The system of claim 1, wherein said vehicle data comprises at least one of: amount of fuel, odometer count and engine speed.

5. The system of claim 1, wherein said requests are encrypted, further comprising an interpreter connected between said wireless short range communication module and said network protocol interface, said interpreter configured to:
    receive said encrypted requests from said gateway module;
    interpret said received requests;
    send said interpreted requests to said network protocol interface; and
    send derived vehicle data to said gateway module.

6. The system of claim 5, wherein said interpreter is further configured to encrypt said derived vehicle data before sending it to said gateway module.

7. The system of claim 5, further comprising a communication controller configured to power said wireless short range communication module based on data received from said On-Board Diagnostics port and connect said network protocol interface with said interpreter;
    wherein said data received from said On-Board Diagnostics port indicates that said vehicle's ignition switch is turned ON.

8. The system of claim 1, further comprising a communication controller configured to power said wireless short range communication module based on data received from said On-Board Diagnostics port and connect said network protocol interface with said wireless short range communication module;
    wherein said data received from said On-Board Diagnostics port indicates that said vehicle's ignition switch is turned ON.

9. The system of claim 1, wherein said mobile communication device is further configured to upload said derived vehicle data received by said gateway module to a server.

10. The system of claim 9, wherein said server comprises a service provider's server.

11. A method of automatically establishing a data connection between an automotive interface component and a mobile communication device, comprising:
    providing an automotive interface component connected to a vehicle's On-Board Diagnostics (OBD) port, said interface component comprising:
        a wireless short range communication module; and
        a vehicle network protocol interface;
    providing a mobile communication device running a gateway module;
    representing an automatically recognizable profile and a non-automatically recognizable profile by said interface component;
    detecting said automatically recognizable profile by said mobile communication device;
    upon detection of said automatically recognizable profile, searching for said non-automatically recognizable profile by said mobile communication device; and
    automatically establishing a data connection between said interface component and said mobile communication device via said non-automatically recognizable profile.

12. The method of claim 11, further comprising:
    receiving data requests from said gateway module;
    deriving vehicle data from said vehicle's networks according to said data requests; and
    sending said derived vehicle data to said gateway module.

13. The method of claim 12, wherein said interface component further comprises an interpreter and wherein said data requests comprise encrypted data requests, the method further comprising:
    interpreting said encrypted data requests by said interpreter.

14. The method of claim 13, further comprising:
encrypting said derived vehicle data.

15. The method of claim 13, wherein said interface component further comprises a communication controller, the method further comprising:
   receiving from said OBD port data indicating that said vehicle's ignition switch is turned ON;
   powering said wireless short range communication module; and
   connecting said network protocol interface with said interpreter.

16. The method of claim 13, further comprising:
uploading said derived vehicle data to a server by said mobile communication device.

17. The method of claim 16, wherein said server comprises a service provider's server.

18. The method of claim 12, further comprising:
uploading said derived vehicle data to a server by said mobile communication device.

19. The method of claim 18, wherein said server comprises a service provider's server.

20. The method of claim 11, wherein said interface component further comprises a communication controller, the method further comprising:
   receiving from said OBD port data indicating that said vehicle's ignition switch is turned ON;
   powering said wireless short range communication module; and
   connecting said network protocol interface with said wireless short range communication module.

21. The method of claim 11, wherein said automatically recognizable profile is a Human Interface Device (HID) profile.

22. The method of claim 11, wherein said non-automatically recognizable profile is a Serial Port Profile (SPP).

* * * * *